(12) United States Patent
Saeki et al.

(10) Patent No.: US 11,753,103 B2
(45) Date of Patent: Sep. 12, 2023

(54) STRADDLE VEHICLE

(71) Applicant: KAWASAKI MOTORS, LTD., Akashi (JP)

(72) Inventors: Daisuke Saeki, Kobe (JP); Shinji Ikeda, Akashi (JP); Hiroaki Amano, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 249 days.

(21) Appl. No.: 17/247,667

(22) Filed: Dec. 18, 2020

(65) Prior Publication Data
US 2021/0188384 A1   Jun. 24, 2021

(30) Foreign Application Priority Data

Dec. 19, 2019   (JP) .................................. 2019-228877

(51) Int. Cl.
*B62J 45/42*   (2020.01)
*B62J 45/41*   (2020.01)
*B62J 6/022*   (2020.01)

(52) U.S. Cl.
CPC ............... *B62J 45/42* (2020.02); *B62J 6/022* (2020.02); *B62J 45/41* (2020.02)

(58) Field of Classification Search
CPC ............. B62J 45/00; B62J 45/41; B62J 45/42
See application file for complete search history.

(56) References Cited

U.S. PATENT DOCUMENTS

| 2014/0015656 | A1* | 1/2014 | Shimizu | ................. | B60Q 5/008 340/425.5 |
| 2016/0068215 | A1* | 3/2016 | Kunisada | ................. | B62J 11/13 74/551.8 |
| 2016/0176467 | A1* | 6/2016 | Ishii | ........................ | B62K 11/04 180/219 |
| 2017/0001674 | A1* | 1/2017 | Ishii | ........................ | B62J 6/022 |

(Continued)

FOREIGN PATENT DOCUMENTS

| EP | 3078987 | 10/2016 |
| EP | 3453600 A1 | 3/2019 |

(Continued)

OTHER PUBLICATIONS

Wallich, "An Ealy-Warning System for your Bike, Low-Cost Lidar can Detect Approaching Cars" Faculty of Information and Technology, National University of Civil Engineering, Vietnam, Jun. 25, 2015, 2 pages.

*Primary Examiner* — Zheng Song
(74) *Attorney, Agent, or Firm* — Fay Kaplun & Marcin, LLP

(57) ABSTRACT

A motorcycle includes a branch frame, a hanging frame, a front cowl, and a radar device. The branch frame is located in front of a head pipe and supported by the head pipe. The hanging frame is connected to the branch frame and includes a plurality of extension portions extending downward from the branch frame and an attachment portion connecting at least two of the plurality of extension portions to each other. The front cowl is arranged at a front part of the motorcycle and protrudes forward. A recess is formed at a rear side of the front cowl. The radar device is supported by the attachment portion of the hanging frame and arranged in the recess in the front cowl.

15 Claims, 6 Drawing Sheets

(56) References Cited

U.S. PATENT DOCUMENTS

| | | | |
|---|---|---|---|
| 2017/0327026 A1* | 11/2017 | Suzuki | B60Q 1/0023 |
| 2018/0252381 A1* | 9/2018 | Kitayama | B60Q 1/0011 |
| 2020/0361554 A1* | 11/2020 | Kumasaka | B62J 45/41 |
| 2020/0398924 A1* | 12/2020 | Kuroba | B62J 45/42 |
| 2021/0061388 A1* | 3/2021 | Maeda | F21S 41/30 |
| 2021/0061389 A1* | 3/2021 | Kawamura | B62J 45/41 |
| 2021/0061395 A1* | 3/2021 | Koga | H01Q 1/52 |
| 2021/0078657 A1* | 3/2021 | Kuroba | F21S 43/14 |

FOREIGN PATENT DOCUMENTS

| | | |
|---|---|---|
| EP | 3476708 | 5/2019 |
| JP | 5-28793 | 4/1993 |
| JP | 9-95273 | 4/1997 |
| JP | 10-147272 | 6/1998 |
| JP | 10-226380 | 8/1998 |
| JP | 2007-42605 | 2/2007 |
| JP | 2019048554 A | 3/2019 |
| WO | 2019/167220 | 9/2019 |
| WO | 2019/180941 | 9/2019 |
| WO | 2019/224957 | 11/2019 |

* cited by examiner

STRADDLE VEHICLE

FIELD OF THE INVENTION

The present invention relates to a straddle vehicle including a radar device.

BACKGROUND

Japanese Patent Application Laid-Open No. 2019-048554 discloses a motorcycle including a radar device for detecting an area in front of the motorcycle.

The radar device of Japanese Patent Application Laid-Open No. 2019-048554 is attached on a bracket connected to a body frame of the motorcycle. The radar device is located at a relatively high position inside the front cowl (e.g., at the same height as the headlight).

SUMMARY

Japanese Patent Application Laid-Open No. 2019-048554 does not disclose a structure for attaching the radar device in a relatively low position inside the front cowl. When the radar device is attached at a relatively low position inside the front cowl, it is difficult to stabilize the posture of the radar device because the member connecting the radar device to the body frame may be long.

The present invention relates to a configuration for stabilizing posture of a radar device in a straddle vehicle in which the radar device is arranged in a relatively low position inside a front cowl.

An aspect of the present invention provides a straddle vehicle as follows. That is, the straddle vehicle includes a first frame, a hanging frame, a front cowl, and a radar device. The first frame is located in front of a head pipe and supported by the head pipe. The hanging frame is connected to the first frame. The hanging frame includes a plurality of extension portions extending downwardly from the first frame and an attachment portion connecting at least two of the plurality of extension portions to each other. The front cowl is located at the front part of the straddle vehicle and protrudes forward and forms a recess at the rear side of the straddle vehicle.

The radar device is supported by the attachment portion of the hanging frame and is arranged in the recess of the front cowl.

This allows the hanging frame to include at least two extension portions instead of one extension portion, thereby stabilizing the attachment portion that supports the radar device. As a result, the radar device can be located lower than the first frame, which is relatively low, and the posture of the radar device can be stabilized. In particular, the radar device is relatively heavy among electrical components, and the posture change is undesirable. Therefore, the effect of being able to stabilize the posture can be effectively utilized.

According to the present invention, the posture of the radar device can be stabilized in a straddle vehicle in which the radar device is arranged in a relatively low position inside the front cowl.

DETAILED DESCRIPTION

Next, embodiments of the present invention will be described with reference to the drawings. In the following explanation, the left-right direction of the motorcycle (straddle vehicle) 1 is defined based on the view from a driver (rider) riding on the motorcycle 1. Therefore, the front-rear direction coincides with a vehicle length direction and the left-right direction coincides with a vehicle width direction. The up-down direction (vertical direction) coincides with a height direction.

Figure 1:
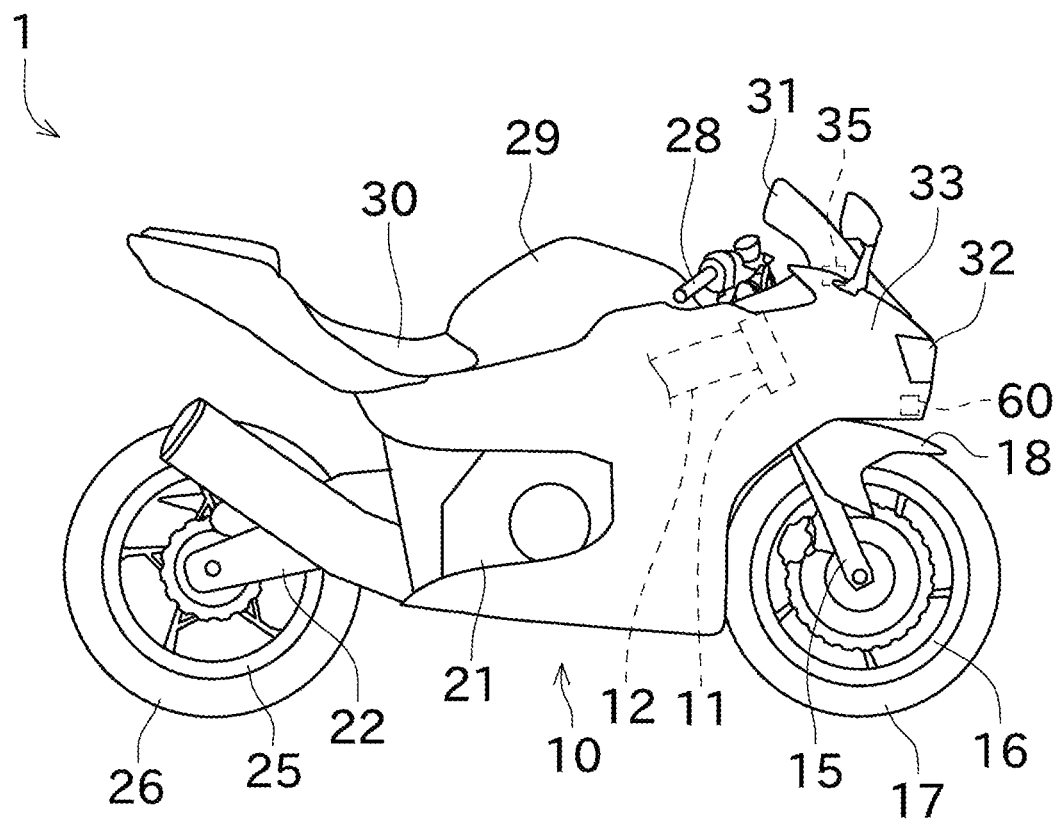
FIG. 1 is a side view of a motorcycle of an embodiment of the present invention.
Figure 2:
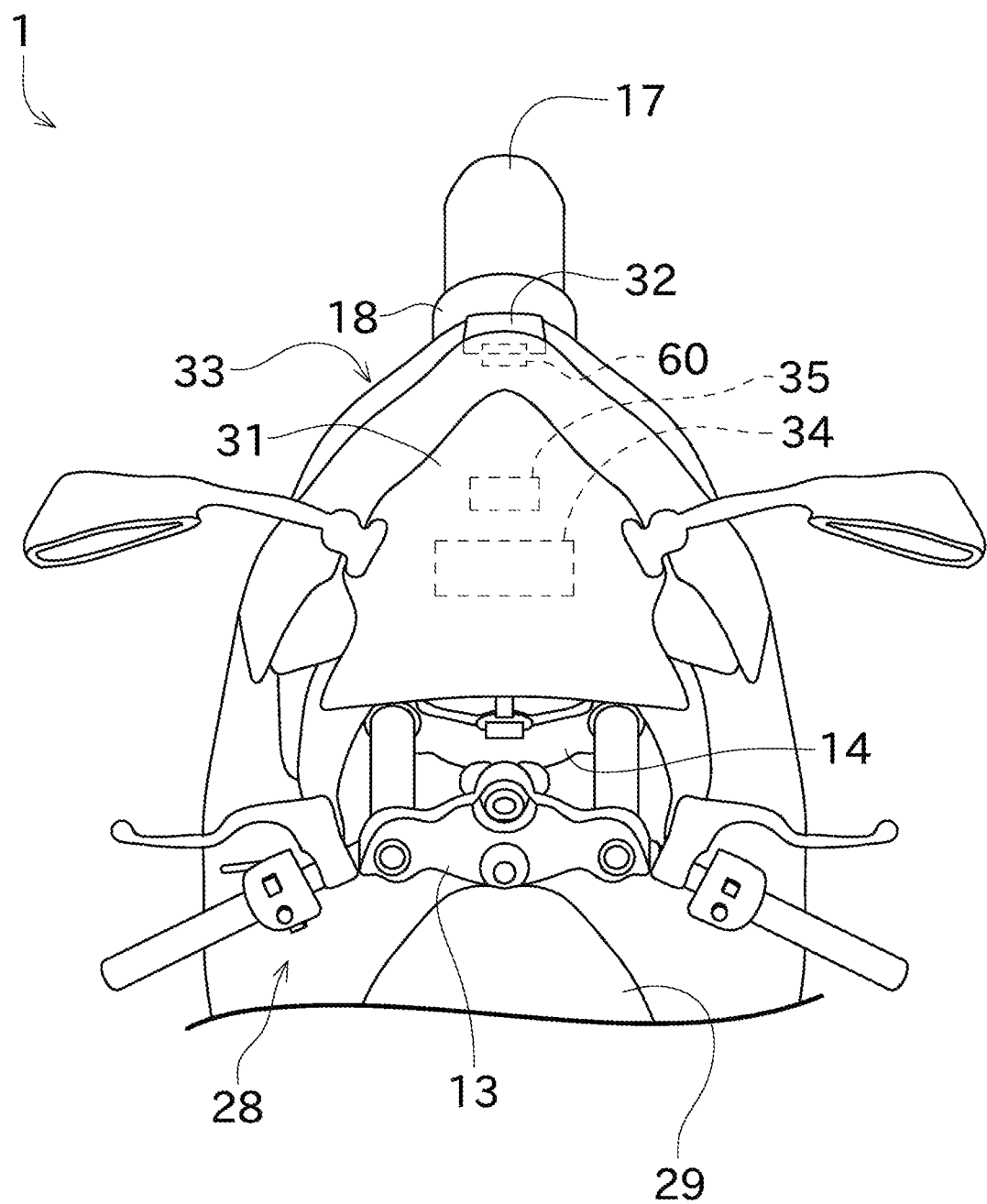
FIG. 2 is a plan view of a front part of the motorcycle.

First, an outline of the motorcycle 1 of this embodiment will be described with reference to FIG. 1 and FIG. 2. FIG. 1 is a side view of the motorcycle 1. FIG. 2 is a plan view of a front part of the motorcycle 1.

As shown in FIG. 1, a motorcycle 1 is provided with a vehicle body 10. The vehicle body 10 includes a plurality of body frames as a framework of the motorcycle 1. The motorcycle 1 is provided with a head pipe 11 and a main frame 12 as the body frame. The configuration of the body frames is an example, and may be different.

The head pipe 11 has a shaft insertion hole for inserting a steering shaft (not shown). An upper bracket 13 is located above the head pipe 11. A lower bracket 14 is located below the head pipe 11. The upper bracket 13 and the lower bracket 14 have fork insertion holes for inserting the left and right front forks 15, respectively. A front wheel 16 is rotatably attached to the lower part of the front fork 15. A front tire 17 is attached on the front wheel 16. The upper side of the front tire 17 is covered by the front fender 18.

The main frame 12 is connected to the head pipe 11. The main frame 12 is arranged to extend rearward from the head pipe 11. An engine 21 is attached to the main frame 12 directly or via another member. A swing arm 22 is attached to the rear part of the main frame 12. A rear wheel 25 is rotatably attached to the rear part of the swing arm 22. A rear tire 26 is attached to the rear wheel 25.

The engine 21 generates power, and the power is transmitted to the rear wheel 25 via the drive chain (not shown). This allows the motorcycle 1 to be driven. The engine 21 in this embodiment is a gasoline engine. In place of or in addition to the gasoline engine, another drive source, such as an electric motor for driving, may be provided.

A handlebar-type steering handle 28 is arranged near the upper end of the front fork 15. By turning the steering handle 28 by the driver, the front forks 15 are turned so that the motorcycle 1 can be turned and the direction of travel can be changed. The motorcycle 1 is a lean type vehicle that is a vehicle in which the vehicle body 10 is inclined relative to a road surface toward a center of the turn when turning.

A fuel tank 29 is arranged behind the steering handle 28 and above the engine 21, and the fuel tank 29 stores fuel for supplying the engine 21. A seat 30 for the driver to be seated is arranged behind the fuel tank 29. A step (not shown) is arranged on the left side and the right side of the vehicle body 10, respectively. The driver straddles the seat 30 and places his feet on the left step and right step. Thus, since the driver is seated astride the seat 30, the motorcycle 1 is a straddle vehicle.

A windscreen 31 is arranged in front of the steering handle 28. The windscreen 31 is arranged to extend backwardly and upwardly from the lower end (base). With this configuration, the windscreen 31 guides the driving wind to make the driving wind less likely to hit the driver. The windscreen 31 is transparent or translucent, and the windscreen 31 can transmit visible light in order to ensure the driver's vision.

A camera 35 is located at the rear of the windscreen 31. The camera 35 is located so as to overlap with the center of the vehicle width direction. The camera 35 photographs an area in front of the motorcycle 1 through the windscreen 31. The image generated by the camera 35 is output to the control unit (not shown). The control unit performs vehicle control based on the received image. For example, the control unit detects a foregoing vehicle, an oncoming vehicle, an obstacle, a pedestrian, or the like. In accordance with the detection result, the control unit controls to change the irradiation direction or irradiation position of the headlight 32 or to perform the brake to assist in preventing collision with obstacles or pedestrians.

A headlight 32 is arranged in the front of the vehicle body 10 to irradiate the front of the vehicle. The light source of the headlight 32 is, for example, an incandescent bulb, a halogen bulb, a high-intensity-discharge (HID) lamp, or a light-emitting diode (LED). The headlight 32 of this embodiment is arranged so that the headlight 32 overlaps with the center of the vehicle width direction. The "overlap with the center of the vehicle width direction" means, for example, that the virtual line passing through the center of the motorcycle 1 in the vehicle width direction in plan view overlaps with the headlight 32. The headlights 32 may be provided in pairs, for example, a pair of right and left headlights.

A cowl is arranged on the outer surface of the motorcycle 1. The cowl is made of resin and is made of a material that can transmit electromagnetic wave of frequency used in radar or the like. The cowl is provided for the purpose of reducing the aerodynamic drag of the motorcycle 1, protecting the various parts of the motorcycle 1, and improving the appearance of the motorcycle.

In this specification, the cowl arranged primarily at the front part of the motorcycle 1 is referred to as the front cowl 33. The front part of the motorcycle 1 is the part of the motorcycle 1 that is forward of the center in the vehicle length direction of the motorcycle 1, for example, the part that is forward of the seat 30. The front cowl 33 is shaped to protrude forward. Therefore, a recess is formed behind the front cowl 33 or in the front cowl 33, and a space is formed by this recess in the front cowl 33. The outline of the front cowl 33 includes portions that decrease in size in the vehicle width direction and in the height direction as they approach the front. As a result, the space in the front cowl 33 also includes portions that decrease in size in the vehicle width direction and height direction as they approach the front. In the front cowl 33, a headlight 32 or the like is arranged.

Next, a radar device 60 included in the motorcycle 1 will be described. A radar device transmits electromagnetic waves (such as infrared rays, millimeter waves, or microwaves) forward and receives the reflected waves (electromagnetic waves) reflected by the target. The radar device detects the direction in which the target exists and the distance to the target. Therefore, it is preferable that no object that does not transmit electromagnetic waves is placed in front of the radar device 60. In this respect, the cowl of this embodiment is made of a material that is capable of transmitting electromagnetic waves, so it does not interfere with the transmission and reception of electromagnetic waves. The detection results of the radar device 60 are output to the control unit described above. Based on the presence or absence of a target in front of the vehicle and the distance to the target, the control unit notifies the driver of information about the target and performs the brakes to assist in preventing a collision with the object.

Figure 3:
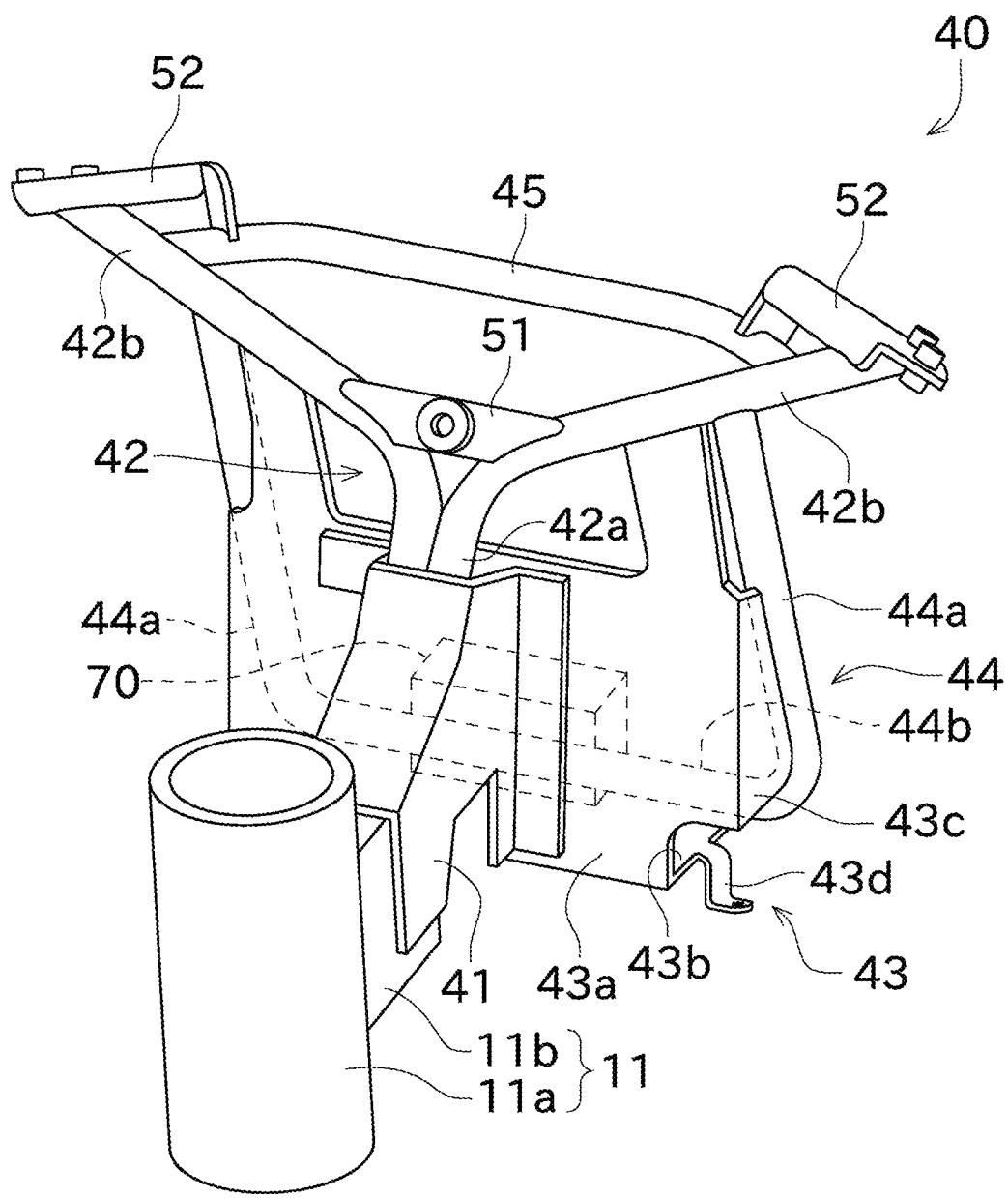
FIG. 3 is a perspective view of a support frame viewed from rear of the motorcycle.
Figure 4:
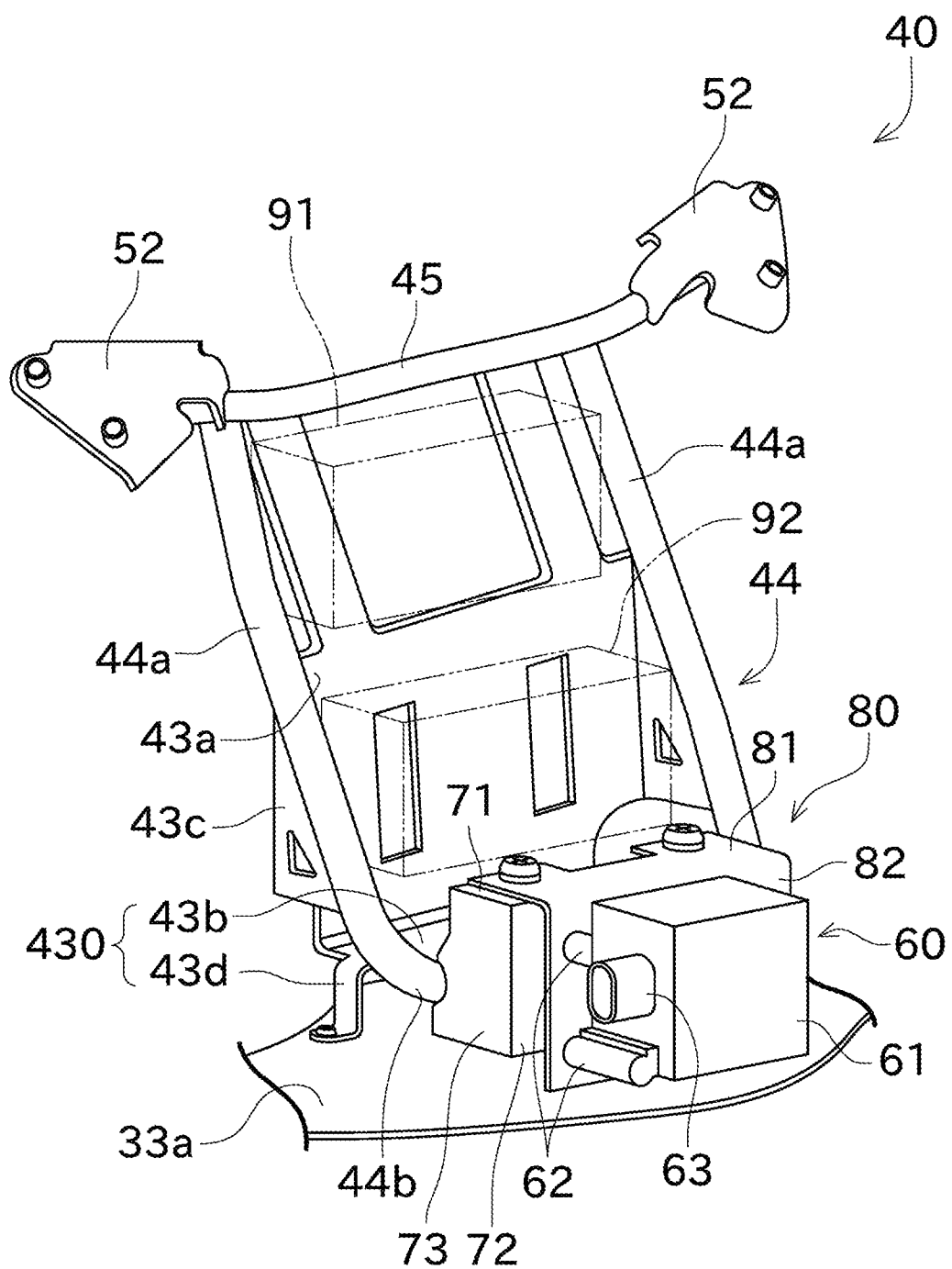
FIG. 4 is a perspective view of a radar stay and a radar device viewed from front of the motorcycle.

Next, a frame structure for supporting the radar device 60 will be described with reference to FIG. 3 and FIG. 4. As shown in FIG. 3, the head pipe 11 has a cylindrical portion 11a in which a shaft insertion hole is formed, and an attachment base 11b extending forward from the cylindrical portion 11a. The cylindrical portion 11a and the attachment base 11b are connected by welding, for example.

A support frame 40 is attached to the attachment base 11b. The support frame 40 is connected to the head pipe 11 and is located forward of the head pipe 11. The support frame 40 is a frame for supporting a plurality of electrical components including the radar device 60. The support frame 40 has a connection frame 41, a branch frame 42, a plate-shaped frame 43, a hanging frame 44, and a front frame 45.

The connection frame 41 is a frame for connecting with the attachment base 11b. The connection frame 41 is configured to allow insertion of the attachment base 11b. The connection frame 41 and the attachment base 11b are connected by using, for example, a fixture such as a bolt and nut which are not shown in figures. The connection frame 41 and the attachment base 11b may be connected by welding.

The branch frame 42 includes a branch point. The branch frame 42 has a junction portion 42a at the rear side from the branch point and a branch portion 42b at the front side from the branch point. The junction portion 42a is connected to the connection frame 41. The branch portion 42b branches from the branch point so as to spread to one side and the other side in the vehicle width direction.

The plate-shaped frame 43 is a plate-shaped member having an abbreviated L-shape. The plate-shaped frame 43 has a first plate 43a and a second plate 43b comprising an L-shape, and a triangular-shaped third plate 43c connecting the first plate 43a and the second plate 43b. The first plate 43a is connected to the connection frame 41 and the branch portion 42b. A plurality of stays (not shown) for attaching electrical components or the like are connected to the front side surface of the first plate 43a. As shown in FIG. 4, the spaces located at the front side of the first plate 43a are referred to as a first space 91 and a second space 92 in order from the upper side. One or more electrical components are arranged in the first space 91 and the second space 92, respectively. For example, the headlight 32, the engine control unit, and the relay box are located in either the first space 91 or the second space 92. The second plate 43b is connected to the hanging frame 44. A leg part 43d is connected to the second plate 43b. The leg part 43d is connected to the lower wall 33a of the space within the front cowl 33. In other words, the hanging frame 44 is connected to the lower wall 33a via the second plate 43b and the leg part 43d. This allows the posture of the plate-shaped frame 43 to be stabilized. The second plate 43b and the leg part 43d together may be referred to as the connection member 430.

The plate-shaped frame 43 may be other shape other than the plate shape. In other words, it is sufficient to have a first portion of any shape that is connected to the connection frame 41 and the branch frame 42 and extends vertically, and a second portion of any shape that is connected to the lower wall 33a via the leg part 43d and extends horizontally. If these first and second portions are sufficiently rigid, the third portion (corresponding to the third plate 43c) connecting the first and second portions can be omitted.

The hanging frame 44 is an abbreviated U-shaped pipe-like member. The hanging frame 44 is composed of a single pipe member which is bent. In the following, the hanging frame 44 is described by dividing two extension portions 44a and an attachment portion 44b. The extension portion 44a is shaped to extend downwardly (in detail, obliquely downwardly in front). In other words, the longitudinal direction of the extension portion 44a coincides with the up-down direction (diagonally downward in front). The upper end of the left side extension portion 44a is connected to the left side branch portion 42b. The upper end of the right side extension portion 44a is connected to the right side branch portion 42b. The extension portion 44a is connected to the third plate 43c. The lower ends of the left and right extension portions 44a are connected to each other at the attachment portion 44b. The attachment portion 44b is shaped to extend in the vehicle width direction.

In this embodiment, the hanging frame 44 is made by bending a single pipe. The hanging frame 44 may be manufactured by connecting a plurality of members by welding or fixture. In this embodiment, there are two extension portions 44a. There may be three or more extension portions 44a. In this embodiment, an attachment portion 44b is connected to the lower end of the extension portion 44a. The attachment portion 44b may be connected to the middle portion of the extension portion 44a.

The front frame 45 extends in the vehicle width direction. The front frame 45 connects the left and right branch portions 42b. Specifically, the left end of the front frame 45 is connected to the left branch portion 42b, and the right end of the front frame 45 is connected to the right branch portion 42b.

The support frame 40 includes a meter stay 51, a mirror stay 52, and a camera stay 53. The meter stay 51 is a member for attaching the meter device 34 and is connected near the branch point of the branch frame 42. The meter device 34 is a display device that shows a vehicle speed and an engine speed, etc. The meter device 34 is attached by the meter stay 51 and other stays. The mirror stay 52 is a member for attaching the left and right side mirrors and is connected to both the branch portion 42b and the front frame 45. The radar stay 70 is a member for attaching the radar device 60 and is connected to the attachment portion 44b of the hanging frame 44. In addition to the radar stay 70, the hanging frame 44 may also have stays for attaching other electrical components or the like.

Figure 5:
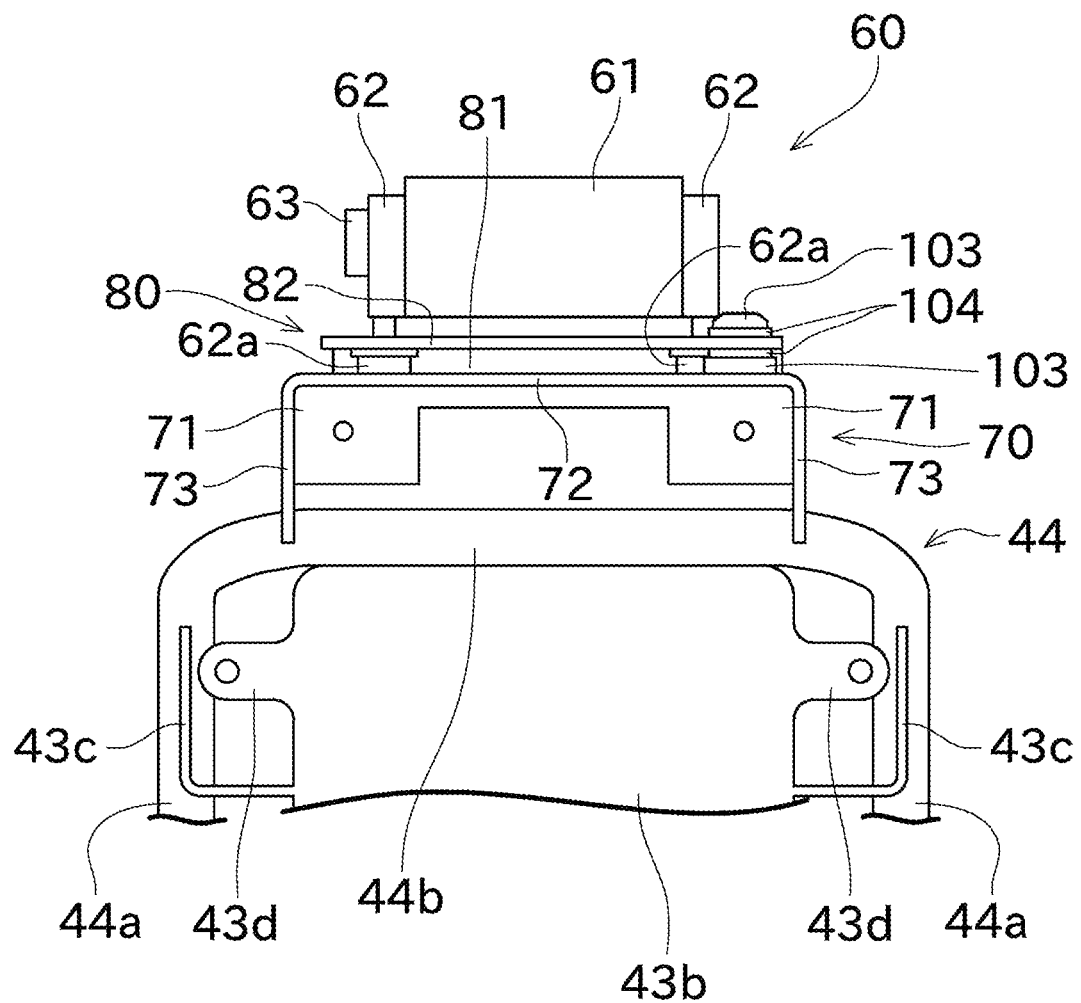
FIG. 5 is a bottom view of the radar stay and the radar device.
Figure 6:
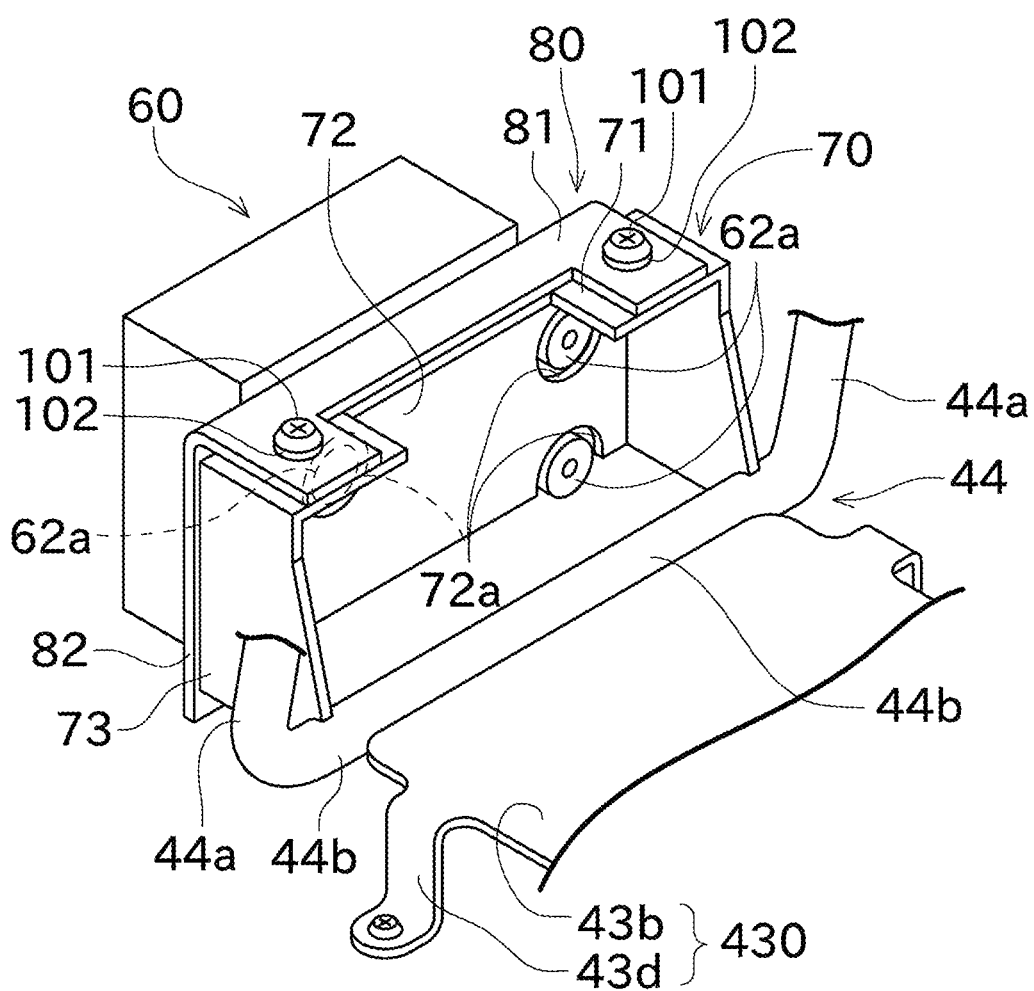
FIG. 6 is a perspective view of the radar stay and the radar device viewed from rear of the motorcycle.

Next, with reference to FIG. 4 to FIG. 6, the configuration of the radar device 60 will be described. As shown in FIG. 4 to FIG. 6, the radar device 60 has a main body 61, an orientation (aiming) adjustment mechanism 62, and a connector 63.

The main body 61 includes a rectangular shape (a rectangular parallelepiped shape, a cuboid shape) case. In this specification, a rectangular shape includes a substantially rectangular shape. Thus, for example, even if at least one of the six surfaces includes a curved surface or a step, the main body 61 corresponds to a "rectangular shape". Even if at least one of the six surfaces is a shape other than a rectangle, the main body 61 corresponds to a "rectangular shape". An antenna and circuits for transmitting and receiving electromagnetic waves are arranged into the rectangular-shaped case. Electromagnetic waves are transmitted and received from the front of the main body 61.

The orientation adjustment mechanism 62 is a mechanism for adjusting the orientation of the radar device 60 (e.g., the first rotation angle with the up-down direction as the rotation center and the second rotation angle with the left-right direction as the rotation center). As shown in FIG. 6, the orientation adjustment mechanism 62 has three adjustment parts 62a. By performing an operation (e.g., a rotation operation) to adjust these adjustment parts 62a, the orientation of the radar device 60 can be adjusted. The adjustment parts 62a are arranged rearward from the main body 61. Thus, the operator operates the adjustment parts 62a from the rear side of the radar device 60.

The connector 63 is arranged on one side (left side or right side) of the main body 61 in the vehicle width direction. A power supply line to the main body 61 and a signal line for outputting the detection results of the main body 61 to the control unit described above are connected to the connector 63. The image data may be output wirelessly instead of wired.

Next, referring to FIG. 4 to FIG. 6, the attachment structure of the radar device 60 will be described. A radar bracket 80 is attached to the radar stay 70 described above, and the radar device 60 is attached to the radar bracket 80. This allows the radar device 60 to be attached at a position lower than the first space 91 and the second space 92.

The radar stay 70 includes a first attachment portion 71, a second attachment portion 72, and a frame connection portion 73.

The first attachment portion 71 is a plate-shaped portion having a surface perpendicular to the up-down direction (which is a first attachment surface). An attachment hole (not shown) is formed in the first attachment portion 71 for attaching the radar bracket 80.

The second attachment portion 72 is a plate-shaped portion having a surface perpendicular to the front-rear direction (which is a second attachment surface). An angle between the first attachment portion 71 and the second attachment portion 72 is 90 degrees. The angle between the first attachment portion 71 and the second attachment portion 72 may be any other angle. As shown in FIG. 6, an opening portion 72a is formed in the second attachment portion 72 to enable the adjustment part 62a to be operated. The opening portion 72a is a through hole or a notch. In addition, an attachment hole is formed in the second attachment portion 72 for attaching the radar bracket 80.

The frame connection portion 73 is a portion connected to the attachment portion 44b. The frame connection portion 73 is welded to the front surface of the attachment portion 44b and is provided so as to protrude forward from the attachment portion 44b. This makes it possible to position the radar device 60 more forward. The frame connection portion 73 is not in contact with the lower wall 33a.

The radar bracket 80 is an L-shaped plate-like member provided with a first attachment portion 81 and a second attachment portion 82.

The first attachment portion 81 is a plate-shaped portion having a surface perpendicular to the up-down direction. After the first attachment portion 81 is placed on the upper surface (first attachment surface) of the first attachment portion 71, the first attachment portion 81 is attached to the first attachment portion 71 using the fixture 101, as shown in FIG. 6. A vibration reduction member (first vibration reduction member) 102 is sandwiched between the fixture 101 and the first attachment portion 81. This allows the radar device 60 to be supported so that the vibration of the radar device 60 reduces.

By not attaching the radar device 60 directly on the radar stay 70 but through the radar bracket 80, the weight of the radar device 60 can be supported on a surface perpendicular to the vertical direction (the upper surface of the first attachment portion 71). This makes it possible to stabilize the posture of the radar device 60.

The second attachment portion 82 is a plate-like portion having a surface perpendicular to the front-rear direction. The angle between the first attachment portion 81 and the second attachment portion 82 is 90 degrees. The angle between the first attachment portion 81 and the second attachment portion 82 may be any other angle. As shown in FIG. 5, the second attachment portion 82 is attached to the front side of the second attachment portion 72 using a fixture 103. A vibration reduction member (second vibration reduction member) 104 is sandwiched between the fixture 103 and the second attachment portion 82. This allows the radar device 60 to be supported so that the vibration of the radar device 60 reduces. Since the adjustment part 62a is arranged in three of the four corners of the second attachment portion 82, the fixture 103 and the vibration reduction member 104 are arranged in the other remaining corner.

The axial direction of the fixture 101 and the vibration reduction member 102 for attaching the first attachment portion 81 is up-down direction, and the axial direction of the fixture 103 and the vibration reduction member 104 for attaching the second attachment portion 82 is front-rear direction. The vibration reduction members 102, 104 can reduce vibration mainly in the axial direction. Accordingly, as in this embodiment, the different axial directions of the vibration reduction members 102, 104 can suppress the vibrations in various directions transmitted to the radar device 60.

In the state in which the radar device 60 is attached to the radar stay 70 using the radar bracket 80, the radar bracket 80 and the radar device 60 do not contact the lower wall 33a. Therefore, the orientation of the radar device 60 can be adjusted downward. On the other hand, by supporting the radar device 60 or the like in this manner, the weight of the radar device 60, the radar stay 70, and the radar bracket 80 is supported by the hanging frame 44. Therefore, there is a concern that the hanging frame 44 may be deformed or gyrated. However, in this embodiment, since the hanging frame 44 is supported by the lower wall 33a via the connection member 430 (the second plate 43b and the leg part 43d), deformation and gyrating of the hanging frame 44 can be prevented, and as a result, the posture of the radar device 60 can be stabilized.

If the radar stay 70 is configured so that the orientation of the radar stay 70 does not change when the orientation of the radar device 60 is adjusted, the lower end of the second attachment portion 72 of the radar stay 70 may be in contact with the lower wall 33a. Accordingly, the posture of the radar device 60 can be stabilized.

Next, the layout of the radar device 60 will be described.

As shown in FIG. 1 and FIG. 2, the radar device 60 of this embodiment is arranged so as to overlap with the center of the vehicle width direction of the motorcycle 1. Further, the radar device 60 is arranged such that the radar device 60 overlaps the headlight 32 in plan view and is below the headlight 32. The front cowl 33 of this embodiment has a shape in which the size in the vehicle width direction decreases as it approaches the front end. This may make it difficult to line up both the radar device 60 and the headlight 32, which are preferably located at the front end, in the vehicle width direction. In this respect, by arranging the radar device 60 and the headlight 32 above and below as in this embodiment, both can be arranged at the front end of the front cowl 33.

The detection range of the radar device 60 varies depending on a control, a spec, or a purpose. Since the radar device 60 basically detects obstacles on the road (obstacles in the sky need not be detected), for example, the detection range in the left-right direction may be wider than the detection range in the up-down direction. In this case, if the radar device 60 and the headlight 32 are arranged side by side in the vehicle width direction, the headlight 32 may interfere with the detection range of the radar device 60 if the headlight 32 is located only slightly in front of the radar device 60. In this regard, by arranging the radar device 60 and the headlight 32 side by side in the up-down direction, a wide range in the left-right direction can be detected.

In this embodiment, in addition to the radar device 60 and the headlight 32, a camera 35 is further arranged in an up-down direction. Specifically, as shown in FIG. 1, the camera 35, the headlight 32, and the radar device 60 are arranged in this order from the top. As shown in FIG. 2, the camera 35, the headlight 32, and the radar device 60 are located so as to overlap with the center of the vehicle width direction (of the motorcycle 1). Accordingly, in a front view, the camera 35, the headlight 32, and the radar device 60 overlap with a straight line passing through the center of the vehicle width direction. Instead of this layout, the camera 35, the headlight 32, and the radar device 60 may be configured to overlap with a single straight line that passes through other than the center of the vehicle width direction and the line is parallel to the up-down direction.

When the radar device 60 is placed relatively low, as in this embodiment, it must also be considered that the electromagnetic waves are not obstructed by the front tire 17 and the front fender 18. In this regard, the radar device 60 (the center of the radar device 60 in the vehicle width direction and in the vehicle length direction) is located forward of the center of the front wheel 16. In other words, since the radar device 60 is located past the peak height of the front tire 17 and front fender 18, the electromagnetic waves are less likely to be impeded by them.

As described above, the motorcycle 1 includes the branch frame 42, the hanging frame 44, the front cowl 33, and the radar device 60. The branch frame 42 is supported by the head pipe 11 and is located in front of the head pipe 11. The hanging frame 44 is connected to the branch frame 42 and includes a plurality of extension portions 44a extending downward from the branch frame 42 and the attachment portion 44b connecting at least two of the plurality of extension portions 44a to each other. The front cowl 33 is arranged at the front part of the motorcycle 1 and protrudes forward. The recess is formed rear side of the front cowl 33. The radar device 60 is supported by the attachment portion 44b of the hanging frame 44 and arranged in the recess of the front cowl 33.

This allows the hanging frame 44 to include at least two extension portions 44a, thereby stabilizing the attachment portion 44b that supports the radar device 60. As a result, the radar device 60 can be located lower than the first frame, which is relatively low, and the posture of the radar device 60 can be stabilized. In particular, the radar device 60 is relatively heavy among electrical components, and the posture change is undesirable. Therefore, the effect of being able to stabilize the posture can be effectively utilized.

The motorcycle 1 of this embodiment includes the connection member 430 that connects the lower wall 33a in the recess of the front cowl 33 and the hanging frame 44.

This can further stabilize the posture of the radar device 60.

The motorcycle 1 of this embodiment includes the radar stay 70 which is connected to the attachment portion 44b so as to protrude forward from the attachment portion 44b of the hanging frame 44. The radar device 60 is attached to the radar stay 70.

This allows the radar device 60 to be located further forward, so that the electromagnetic waves transmitted and received by the radar device 60 are less likely to be blocked.

In the motorcycle 1 of this embodiment, the radar stay 70 includes the first attachment surface (the upper surface of the first attachment portion 71) and the second attachment surface (the front surface of the second attachment portion 72). The radar device 60 is attached to the first attachment surface via the vibration reduction member 102. The orientation of the second attachment surface is different from the orientation of the first attachment surface. The radar device 60 is attached to the second attachment surface via the vibration reduction member 104.

Accordingly, the vibration in various directions is hard to transmit to the radar device 60, because the radar device 60 is supported by using the vibration reduction member in the two directions.

In the motorcycle 1 of this embodiment, the first attachment surface is a surface perpendicular to the up-down direction. The second attachment surface is a surface perpendicular to the front-rear direction.

As a result, vertical vibrations transmitted from a road surface or the like can be reduced by the vibration reduction member 102 on the first attachment surface. In addition, the vibration reduction member 104 of the second attachment surface can reduce the vibration in the front-rear direction caused by the bending of the hanging frame 44 due to acceleration and deceleration of the motorcycle 1.

In the motorcycle 1 of this embodiment, the radar device 60 includes the orientation adjustment mechanism 62 that adjusts the orientation of the radar device 60 by operating it from the rear side. The opening portion 72a is formed in the second attachment surface of the radar stay 70 for operating the adjustment portion 62a of the orientation adjustment mechanism 62.

As a result, it is possible to achieve both a configuration that reduces vibration in the front-rear direction and a configuration that enables operation of the orientation adjustment mechanism 62 from the rear.

In the motorcycle 1 of this embodiment, the radar device 60 includes the orientation adjustment mechanism 62 for adjusting the orientation of the radar device 60. The radar device 60 is attached to the radar stay 70 so that the radar device 60 does not come into contact with the lower wall 33a in the recess of the front cowl 33.

This prevents, for example, the radar device 60 from contacting the lower wall 33a even when the radar device 60 is oriented so as to be inclined downwardly.

In the motorcycle 1 of this embodiment, the radar device 60 is located below all of the engine control unit, the relay box, and the headlight.

This allows the radar device 60 to be located relatively lower by utilizing the hanging frame 44.

The motorcycle 1 of this embodiment includes the headlight 32 irradiating the front of the motorcycle 1. The headlight 32 and the radar device 60 are arranged so that the headlight 32 and the radar device 60 overlap in plan view and so that the radar device 60 is lower than the headlight 32.

Accordingly, since a space is created by arranging the radar device 60 relatively lower by using the hanging frame 44, the headlight 34 can be arranged in the space.

The motorcycle 1 of this embodiment includes the camera 35 that acquires information for performing vehicle control. The camera 35, the headlight 32, and the radar device 60 are arranged in this order from the top in the up-down direction.

Accordingly, since a space is created at the upper side by arranging the radar device 60 relatively lower by using the hanging frame 44, the camera 35 and the headlight 32 can be arranged in the space.

In the motorcycle 1 of this embodiment, the camera 35, the headlight 32, and the radar device 60 overlap with the straight line drawn parallel to the up-down direction in the front view.

As a result, the position of the camera 35, the headlight 32, and the radar device 60 in the vehicle width direction is aligned, so that the size of the motorcycle 1 in the vehicle width direction can be reduced.

While a preferred embodiment and variations of the present invention have been described above, the configurations described above may be modified, for example, as follows.

The radar device 60 of the above embodiment is not limited to a rectangular shape, but may be other shape. The position of the orientation adjustment mechanism 62 and the connector 63 may be different from the above embodiment. The cover further covering the main body 61 of the radar device 60 and the orientation adjustment mechanism 62 may be integrally configured.

The radar stay 70 of the above embodiment protrudes forward from the hanging frame 44. The radar stay 70 may be configured to protrude in different directions from the hanging frame 44. The radar stay 70 of the above embodiment has two attachment surfaces. There may be one or more than three attachment surfaces of the radar stay 70.

The radar bracket 80 of the above embodiment comprises a single member. Alternatively, the radar bracket 80 may comprise a plurality of components assembled together. The radar bracket 80 of the above embodiment has two attachment surfaces. There may be one or more than three attachment surfaces of the radar bracket 80.

In the above embodiment, an example of applying the present invention to a motorcycle 1 is described, but the present invention can also be applied to other straddle vehicles. Other straddle vehicles are, for example, vehicles with two front wheels and one rear wheel, vehicles with one front wheel and two rear wheels, vehicles with two front wheels and two rear wheels, or the like. Other example of a four-wheeled vehicles are all terrain vehicle (ATV), which is primarily used for driving on unpaved terrain.

What is claimed is:
1. A straddle vehicle, comprising:
a first frame located in front of a head pipe and supported by the head pipe;
a hanging frame connected to the first frame and including a plurality of extension portions extending downward from the first frame and an attachment portion connecting at least two of the plurality of extension portions to each other;
a front cowl arranged at a front part of the straddle vehicle and protruding forward, a recess being formed at a rear side of the front cowl, the recess including a lower wall along an interior surface thereof;
a radar device supported by the attachment portion of the hanging frame and arranged in the recess of the front cowl; and
a connection member connecting the lower wall of the recess of the front cowl and the hanging frame.
2. The straddle vehicle according to claim 1, further comprising a radar stay connected to the attachment portion so as to protrude forward from the attachment portion of the hanging frame, the radar device attached to the radar stay.

3. The straddle vehicle according to claim 2, wherein the radar stay comprising:
   a first attachment surface for attaching the radar device via a first vibration reduction member; and
   a second attachment surface for attaching the radar device via a second vibration reduction member, orientation of the second attachment surface differing from orientation of the first attachment surface.

4. The straddle vehicle according to claim 3, wherein the first attachment surface is a surface perpendicular to an up-down direction, and wherein the second attachment surface is a surface perpendicular to a front-rear direction.

5. The straddle vehicle according to claim 3, further comprising:
   a radar bracket configured to support a weight of the radar device on a surface perpendicular to a vertical direction.

6. The straddle vehicle according to claim 1, further comprising
   a camera acquiring information for controlling the straddle vehicle,
   wherein the camera, a headlight, and the radar device are arranged in this order from a top in an up-down direction.

7. The straddle vehicle according to claim 6, wherein the camera, the headlight, and the radar device overlap with a straight line drawn parallel to the up-down direction in a front view.

8. The straddle vehicle according to claim 1, further comprising:
   a left mirror stay supporting a left side mirror;
   a right mirror stay supporting a right side mirror; and
   a front frame supporting the left and right side mirror stays,
   wherein the hanging frame is a U-shaped member.

9. The straddle vehicle according to claim 8, wherein the first frame is a branch frame connecting the left and right mirror stays with the head pipe.

10. The straddle vehicle according to claim 1, wherein the radar device is located below all of an engine control unit, a relay box, and a headlight.

11. The straddle vehicle according to claim 1, further comprising
    a headlight irradiating a front area of the straddle vehicle,
    wherein the headlight and the radar device are arranged so that the headlight and the radar device overlap in a plan view and the radar device is lower than the headlight.

12. A straddle vehicle, comprising:
    a first frame located in front of a head pipe and supported by the head pipe;
    a hanging frame connected to the first frame and including a plurality of extension portions extending downward from the first frame and an attachment portion connecting at least two of the plurality of extension portions to each other;
    a radar device supported by the attachment portion of the hanging frame; and
    a radar stay connected to the attachment portion, the radar stay configured to protrude forward from the attachment portion of the hanging frame and to include a first attachment surface for attaching the radar device via a first vibration reduction member and a second attachment surface for attaching the radar device via a second vibration reduction member,
    wherein an orientation of the second attachment surface differs from an orientation of the first attachment surface, and
    wherein the radar device is attached to the radar stay and includes an orientation adjustment mechanism adjusting orientation of the radar device, and wherein an opening portion is formed in the second attachment surface of the radar stay for operating the orientation adjustment mechanism.

13. A straddle vehicle, comprising:
    a first frame located in front of a head pipe and supported by the head pipe;
    a hanging frame connected to the first frame and including a plurality of extension portions extending downward from the first frame and an attachment portion connecting at least two of the plurality of extension portions to each other;
    a radar device supported by the attachment portion of the hanging frame; and
    a radar stay connected to the attachment portion so as to protrude forward from the attachment portion of the hanging frame, the radar device attached to the radar stay,
    wherein the radar device includes an orientation adjustment mechanism adjusting orientation of the radar device, and wherein the radar device is attached to the radar stay.

14. A straddle vehicle, comprising:
    a first frame located in front of a head pipe and supported by the head pipe;
    a hanging frame connected to the first frame and including a plurality of extension portions extending downward from the first frame and an attachment portion connecting at least two of the plurality of extension portions to each other;
    a front cowl arranged at a front part of the straddle vehicle and protruding forward, a recess being formed at a rear side of the front cowl;
    a radar device supported by the attachment portion of the hanging frame and arranged in the recess of the front cowl;
    a connection member connecting a lower wall inside the recess of the front cowl and the hanging frame;
    a radar stay connected to the attachment portion so as to protrude forward from the attachment portion of the hanging frame, the radar device attached to the radar stay,
    wherein the radar stay comprises:
       a first attachment surface for attaching the radar device via a first vibration reduction member; and
       a second attachment surface for attaching the radar device via a second vibration reduction member, orientation of the second attachment surface differing from orientation of the first attachment surface; and
    a radar bracket attached to the radar stay and the radar device,
    wherein the radar bracket is an L-shaped plate including a horizontal portion and a vertical portion, the horizontal portion being a plate parallel to a horizontal direction and attached to the radar stay, the vertical portion being a plate parallel to a vertical direction and attached to the radar device, and the vertical portion is connected to a front end of the horizontal portion and extends vertically downward from the horizontal portion.

15. A straddle vehicle, comprising:
- a first frame located in front of a head pipe and supported by the head pipe;
- a hanging frame connected to the first frame and including a plurality of extension portions extending downward from the first frame and an attachment portion connecting at least two of the plurality of extension portions to each other;
- a radar device supported by the attachment portion of the hanging frame and arranged in a recess formed at a rear side of a front cowl at a front part of the straddle vehicle, the recess including a lower wall along an interior surface thereof;
- a connection member connecting the lower wall inside of the recess of the front cowl and the hanging frame;
- a left mirror stay supporting a left side mirror;
- a right mirror stay supporting a right side mirror; and
- a front frame supporting the left and right side mirror stays, wherein the hanging frame is a U-shaped member.

* * * * *